P. H. THOMAS.
ELECTRICAL DISTRIBUTION SYSTEM.
APPLICATION FILED APR. 9, 1910.
1,091,256.
Patented Mar. 24, 1914.
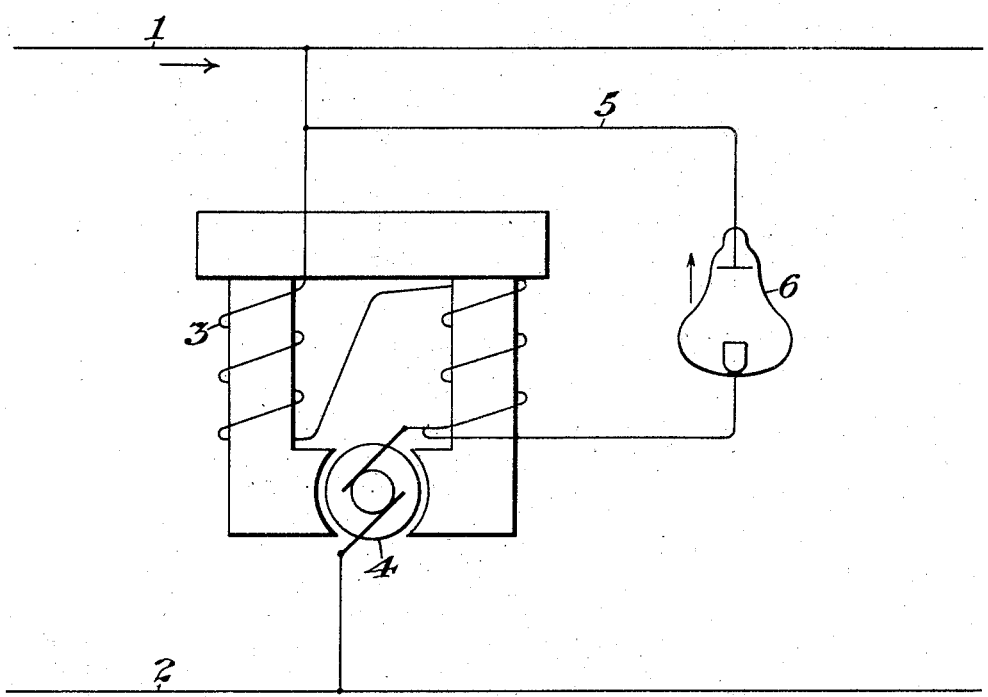
WITNESSES
Chas. J. Clagett
Thos. D. H. Brown
INVENTOR
Percy H. Thomas
BY
George H. Stockbridge
his ATTORNEY

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION SYSTEM.

1,091,256. Specification of Letters Patent. Patented Mar. 24, 1914.

Original application filed March 5, 1903, Serial No. 146,282. Divided and this application filed April 9, 1910. Serial No. 554,401.

*To all whom it may concern:*

Be it known that I, PERCY H. THOMAS, a citizen of the United States, and resident of Montclair, county of Essex, State of New Jersey, have invented certain new and useful Improvements in Electrical Distribution Systems, of which the following is a specification.

The present invention makes use of the qualities of the vapor converter combined with one or more magnets for regulating the current in a portion of a system supplied from a source of varying or pulsating currents. The manner in which this object is accomplished will be understood by reference to the drawing.

In the drawings I illustrate means for maintaining current relatively constant in the field coils of an electric motor supplied from any suitable source. The mains extending from the source are shown at 1 and 2, the field coils at 3, the armature at 4. In a shunt circuit, 5, around the field coils I include a vapor converter, 6, as shown. By virtue of the natural characteristics of vapor electric apparatus of the sort illustrated, the mercury electrode can not become a positive electrode with respect to the solid electrode unless the initial reluctance at the latter electrode is overcome. Accordingly there will be no danger of a short circuit through the shunt, 5, around the field coils 3 in the natural operation of the device. So long as the current supplied from the mains is constant, the vapor converter plays no part in the action of the motor, owing to the fact that it is so adjusted as not to permit the flow of current in the normal direction of flow through the field. When, however, the electro-motive-force in the supply circuit decreases, the reactive effect produced in the field coils will have a tendency to continue the current in the original direction of flow which current will find a path through the vapor converter 6.

I have shown my invention as applied to the control of a series motor. The same principle might be applied to other types of electric motors as well. The field magnets as shown in the drawing obviously serve to steady operation in view of their inductance to smooth out and render more nearly uniform the varying current traversing them.

This application is a division of applicant's case Serial Number 146,282, filed March 5, 1903.

I claim as my invention:

In a system of electrical distribution, the combination with supply mains, a motor including a series winding and an armature and connections between said motor and said mains, of a mercury vapor rectifier comprising an exhausted container and suitable electrodes therein, permitting the passage of current in one direction only, said rectifier connected in shunt to said motor field whereby the discharge of the field traverses the rectifier and the coil itself only.

Signed at New York, in the county of New York, and State of New York, this 5th day of April, A. D. 1910.

PERCY H. THOMAS.

Witnesses:
 WM. H. CAPEL,
 THOS. H. BROWN.